United States Patent [19]

Pedicini

[11] Patent Number: 4,794,056
[45] Date of Patent: Dec. 27, 1988

[54] COILED ELECTRODE ASSEMBLY CELL CONSTRUCTION WITH TELESCOPIC TERMINAL TAB

[75] Inventor: Christopher S. Pedicini, Brunswick, Ohio

[73] Assignee: Eveready Battery Company, St. Louis, Mo.

[21] Appl. No.: 97,551

[22] Filed: Sep. 11, 1987

[51] Int. Cl.⁴ ............... H01M 4/00; H01M 4/02
[52] U.S. Cl. .................... 429/94; 429/66; 429/211; 439/458; 439/883
[58] Field of Search ............ 429/65, 66, 94, 211; 439/32, 33, 457, 458, 874, 883

[56] References Cited

U.S. PATENT DOCUMENTS

| | | | |
|---|---|---|---|
| 3,505,121 | 4/1970 | Bougaran | 136/120 |
| 3,732,124 | 5/1973 | Cailley | 136/13 |
| 3,796,606 | 3/1974 | Lehmann et al. | 429/94 |
| 3,940,198 | 2/1976 | Andersen et al. | 439/32 X |
| 3,960,603 | 6/1976 | Morioka et al. | 429/211 X |
| 4,009,053 | 2/1977 | Schenk et al. | 429/94 |
| 4,053,687 | 10/1977 | Coibion et al. | 429/94 |
| 4,259,416 | 3/1981 | Ikoda et al. | 429/94 |
| 4,322,484 | 3/1982 | Sugalski | 429/94 |
| 4,332,867 | 6/1982 | Tsuda et al. | 429/94 |
| 4,452,869 | 6/1984 | DeMoully et al. | 429/94 |
| 4,529,675 | 7/1985 | Sugalski | 429/94 |

Primary Examiner—Brian E. Hearn
Assistant Examiner—Stephen J. Kalafut
Attorney, Agent, or Firm—Robert W. Welsh

[57] ABSTRACT

The invention relates to a cell employing a coiled electrode assembly having the edge of at least one electrode strip protruding above the coiled electrode assembly and wherein said electrode edge is electronically connected to a tab having a telescopic center portion that can flex below and then above the plane of the tab so that any bulge in the cell's housing will flex the tab without disturbing the electronic contact between the cell's housing and the edge of the electrode strip protruding above the coiled electrode assembly.

23 Claims, 1 Drawing Sheet

COILED ELECTRODE ASSEMBLY CELL CONSTRUCTION WITH TELESCOPIC TERMINAL TAB

FIELD OF THE INVENTION

The invention relates to a coiled electrode assembly cell construction having the edge of at least one coiled electrode strip extending beyond the coiled electrode assembly and electronically connected to the peripheral portion of a conductive tab that can be flexed at its center so that a conductive terminal cover electronically secured to the tab may bulge without disturbing the electronic contact to the electrode strip via the tab.

BACKGROUND OF THE INVENTION

The galvanic cell has become a primary power source for many portable electronic devices such as tape recorders, portable telephones, lanterns, radios and the like. In order to maintain the overall electronic devices as compact as possible, the electronic devices are usually designed with cavities to accommodate batteries as their power source. The cavities are usually made so that a battery can be snugly positioned therein, thus making electronic contact with appropriate terminals within the device. To accommodate the electronic component manufacturers, the battery industry has adapted several conventional size cells which the manufacturers can rely upon in designing their devices which require portable power sources. Due to the large number of battery-powered devices on the market, there has been a demand for increased power output capacities of standard size cells. Accordingly, various cell constructions have been employed so as to provide a sufficient output capacity. For example, cells with coiled electrode assemblies (jellyroll construction) have been used to increase the interfacial area contact between the active cell components. Use of coiled electrodes serves to decrease the cell's internal resistance and thereby increase the maximum possible drain rates. Cells that incorporate a jellyroll construction are widely known in the battery art and usually involve placement of the coiled electrode in a composite housing which serves as the current conductive terminals for the cell. In such structures, the electrode of one polarity can be electrically connected to a conductive housing portion, and the electrode of the opposite polarity can be generally electrically connected to another conductive housing portion which is insulated relative to the electrically conductive first-mentioned housing portion. The electrical contact between each electrode and its respective housing portion is generally formed by an elongated flexible electrically conductive connecting tab (current collector tab) or element which is secured at one end to the electrode and at the other end is secured to the respective housing portion. The current collector tabs are generally attached to the electrodes or electrode carriers, by welding pressure contact or other conventional means. This technique requires time-consuming manual operations in the cell assembly process which serve to reduce line productivity and add to the manufacturing costs. For example, some of the problems associated with using this method of tabbing are: (1) the obvious difficulty of handling and welding narrow strips of metal within the configured space of the cell; (2) dedicating a disproportionate percentage of the volume within the cell to accommodate the tab and assembly process; and (3) the tab is connected to the electrode in only one spot and therefore it is possible that any bulging of the cell could break the weld causing an open circuit; and (4) coil insertion is difficult due to the ease with which the electrodes and/or separator may by damaged.

U.S. Pat. No. 4,332,867 discloses a cell utilizing a coil assembly formed by winding negative and positive plates together with at least one separator therebetween. Each of the positive and negative plates is constituted by a main portion containing battery active materials and an edge portion free of the active material. In the coil assembly, the edge portions of the respective plates protrude outwardly beyond the opposite edges of the separator and are positioned on respective sides of the coil assembly. Positive and negative current collectors are made of a holeless nickel-plated steel sheet and welded to the edge portions of the respective plates by means of a plurality of welds. Although this type of cell construction provides a plurality of weld connectors to the electrode, it is possible that internal pressure buildup would cause the container to bulge thereby stressing the welds and eventually breaking the contact.

It is an object of the present invention to provide a coiled electrode assembly cell construction that can accommodate internal pressure buildup and bulging of the terminal cover without disrupting the electronic continuity between the terminal and one of the cell's electrodes.

Another object of the present invention is to provide a coiled electrode assembly cell construction with a telescopic tab secured to a terminal cover and one of the cell's electrodes and adapted to flex upon bulging of the cell without disturbing the electronic continuity of the cell.

Another object of the invention is to provide a coiled electrode cell construction that employs a telescopic type tab which can follow the edge of an unevenly wound electrode protruding from the coiled assembly and which is electronically secured to the edge of the electrode so that it can accommodate a degree of bulge without disrupting the electronic circuit of the cell.

The foregoing and additional objects will become fully apparent from the following description and the accompanying drawings.

SUMMARY OF THE INVENTION

The invention relates to a galvanic cell comprising a coiled electrode assembly contained in a housing comprising a container sealed with a cover, said coiled electrode assembly comprising a first electrode strip superimposed on and overlapping a second electrode strip and a separator disposed between said first electrode strip and said second electrode strip; said first electrode strip, said second electrode strip and said separator are wound into a coiled electrode assembly such that said first electrode strip is electronically insulated from said second electrode strip by said separator and the edge of at least one electrode strip protrudes from the coiled electrode assembly at one end and electronically contacts a conductive terminal at one end of the housing, and the second electrode strip electronically contacts a conductive terminal at the opposite end of the housing; the improvement wherein a conductive tab has at least one slit disposed substantially about the central area of the tab to enable the central area to flex above or below the plane of the tab without effectively distorting the peripheral area of the tab, said tab being in electronic contact with the protruding edge of the electrode strip, and a conductive portion of the housing is electronically connected to said tab whereby adapting said conductive portion as the conductive terminal for said electrode strip having its edge protruding from the coiled electrode assembly.

A second conductive tab could be employed in the cell of this invention and electronically connected to a protruding edge of the other electrode strip in a similar manner. In the preferred embodiment of this invention at least one opening, preferably two or more equally spaced openings, would be disposed in the area between the peripheral edge of the tab and the central area of the tab. The opening would be defined by an inward flange that would contact the protruding edge of the electrode and thus provide numerous contact points between the tab and the edge of the electrode. Preferring three or more circular openings disposed concentrically about the center of the tab with each opening defined by an inwardly disposed flange would provide a substantial number of contact points between the edge of the electrode and the tab. If one of the electronic connections between the flange and electrode breaks, there still would be several contact points remaining for adequate electronic continuity. The slit disposed substantially about the central area of the tab could be in the form of one arcuate shaped slit or two or more arcuate or straight line shaped slits or combinations thereof as long as the central area of the tab can flex about the plane of the tab without effectively distorting the peripheral area of the tab. Thus, in the preferred embodiment of the invention, the tab, through the inward disposed flanges, would provide numerous contact points to the electrode edge which could easily be welded together while the center area of the tab would flex through the use of the slits and thereby accommodate any bulging of the cell without breaking the welds. The tab of this invention is relatively inexpensive to make and can be easily handled on automatic assembly machines.

The coiled electrode assembly of this invention typically comprises two electrode strips and a separator. One electrode strip acts as an anode or anode current collector and the other serves as a cathode or cathode current collector. The anode or anode current collector, cathode or cathode current collector and separator are made of flexible materials and are typically formed into strips and superimposed upon each other with one electrode overlapping the other. This is accomplished by superimposing and overlapping the first electrode strip over the second electrode strip with the separator interposed between the two electrode strips. This assembly is then wound to form the coiled electrode assembly which is preferably cylindrical in outer contour with a central opening and which has at least the edge of one electrode strip protruding from the top or bottom of the electrode assembly. The central opening in the coiled electrode assembly is typically cylindrical, however, it could be elliptical or of any other configuration.

One electrode strip could be electronically connected to the housing in a conventional manner such as through the use of a tab that has been welded or pressure secured to the electrode and the housing or a peripheral exposed portion of the electrode strip could provide direct electrical contact with the housing. However, the protruding edge of the other electrode strip, according to this invention, has to be electronically connected to the above described tab and in turn said tab is secured to a terminal on the cell's housing.

The tab for use in this invention can be made of any conductive material such as nickel plated steel, nickel foil, aluminum and stainless steel or a non-conductive material coated with a conductive layer, such as plastic films (polyester) coated with a metallic layer or a layer of conductive paint. Generally, this tab should be circular in shape to be compatible with the coiled electrode assembly and relatively thin so that it can flex easily. For most applications the circular tab could be between about 0.001 inch and about 0.01 inch thick and more preferably between about 0.002 and 0.005 inch thick. The tab is relatively thin and therefore occupies only a small volume within the cell.

Preferably at least one peripheral opening should be defined in the tab and spaced from the central area of the tab and more preferably four peripheral openings spaced 90° apart should be disposed concentrically about the central area of the tab. Each opening should be defined by an inwardly disposed flange which is adapted to make pressure contact with the protruding edge of the electrode. The openings are placed between the central area of the tab and the peripheral edge to insure proper contact with the protruding edge of the electrode. Once the circular tab is placed over the coiled electrode assembly, the depending flanges can be welded to the edge of the protruding electrode using known welding means. With the coiled electrode assembly in a container and the tab welded to the edge of the protruding electrode strip, a terminal cover can be placed over and secured to the tab using conventional welding means or the like. This arrangement adapts the cover as the terminal for the electrode strip. If desired, the second electrode strip could project from the opposite side of the coiled electrode assembly and be secured to a similar type tab and cover terminal in accordance with this invention. Bulging of the cell could be accommodated by the telescoping of the central area of the tab without disrupting the electronic contact between the tab and the electrode strip.

In an alternate embodiment of the invention, the openings disposed in the area between the peripheral edge of the tab and the central area of the tab could be replaced by inward protrusions such as dimples. These inward protrusions would contact the edge of the electrode strip and provide numerous contact points between the tab and the electrode strip.

The terminal cover could be a circular disc which would be insulated from the container and used as one terminal for the cell. The cover could also employ a conventional glass-to-metal seal in which a conductive terminal within the glass seal could be electronically connected to the conductive tab thereby adapting the terminal as the electrode terminal for the cell. Other embodiments of the cover can be used with this invention.

As used herein, an electrode strip shall mean an active electrode such as a solid anode or cathode of the cell or an electrochemically inactive strip such as an anode collector or a cathode collector employed along with an active liquid, solid or gas anode or cathode, respectively.

Because of the accepted battery polarity of the commercially available power sources it is preferred that for consumer cells of conventional power, the outer exposed electrode strip which is in electrical contact with the container of the cell be the cathode and the inner wound electrode which is in electrical contact with the cover be the anode. However, in customized cell constructions, the polarity could be reversed to minimize corrosion since the container will be anodically protected.

The coiled electrode assembly of this invention can be used in many different types of cell systems such as aqueous (i.e., alkaline) or nonaqueous cell systems employing solid or liquid cathodes. When the coiled electrode assembly is employed in lithium nonaqueous cells, it would sometimes be preferable to make the lithium the outer wound electrode. The lithium electrode could be superimposed and overlayed on a cathode strip such as $MnO_2$, CuO, $CF_x$, $FeS_2$ or the like with a separator interposed between them, and then wound with the edge of either or both electrodes protruding from the coiled electrode assembly.

The separator for use in this invention could be selected from a number of ionically permeable materials such as polypropylene, felted glass fibers and coated papers.

Cathode current collectors suitable for use in the invention would be sintered nickel or carbonaceous materials such as Teflon-bonded carbon or the like. Anode current collectors suitable for use in the invention would be nickel foil, stainless steel foil, expanded metal, perforated metal or the like.

The cylindrical container and cover for use in an embodiment of this invention can be stainless steel, nickel-plated steel or some other conductive material that will not corrode or otherwise deteriorate when in contact with the active cell components. Preferably for nonaqueous systems the container and cover could be made of 304L type stainless steel.

Any insulating gasket member disposed between the cover and the container has to be stable in the presence of the active components and discharge products and can be selected from such materials as nylon, polypropylene, polyethylene, polytetrafluoroethylene, fluorinated ethylene-propylene polymer, ethylene copolymer with fluorinated ethylenepropylene, polyester, polychlorotrifluoroethylene, perfluoroalkoxy polymer and the like.

Anodes suitable for use in this invention could be lithium, calcium, magnesium, sodium, zinc and the like. Cathodes suitable for use in this invention could be $MnO_2$, HgO, $Ag_2O$, CuO, $FeS_2$, $TiS_2$, $(CF_x)_n$ with x greater than 0 and less than 1.1, $SOCl_2$, $(C_2F)_n$, $SO_2Cl_2$ and $SO_2$. Some preferred cell system for use in this invention would be as shown in the table below.

TABLE

| Anode | Cathode | Electrolyte |
| --- | --- | --- |
| lithium | $MnO_2$ | organic |
| lithium | $SOCl_2$ | $LiAlCl_4$ in $SOCl_2$ |
| lithium | $(CF_x)_n$ | organic |
| zinc | $MnO_2$ | aqueous alkaline |
| cadmium | nickel hydroxide | aqueous alkaline |

When the anode for use in this invention is lithium, then a lithium foil could be secured onto a metallic conductive foil or carrier (anode collector) such as nickel.

The foregoing and additional objects will become more fully apparent from the description hereinafter and the accompanying drawings.

BRIEF DESCRIPTION OF THE DRAWINGS

Referring to the drawing FIG. 1 shows a circular conductive tab 2 having a first arcuate slit 4 and an opposite disposed arcuate slit 6. Each slit comprises about a 220° concentric arc cut through the tab material and each slit overlaps such that the central area 7 can be projected above and also below the plane of the tab thereby forming a telescopic center. Disposed concentric about the center of tab 2 at 90° intervals are openings 8, 10, 12 and 14, with each opening being defined by a depending flange 9, 11, 13 and 15, respectively. FIG. 2 shows a cross-section of a cell employing a coiled electrode assembly 16 comprising a first electrode strip 18, a second electrode strip 20 and a separator 22 therebetween housed in container 21. The first electrode strip 18 and second electrode strip 20 are superimposed and overlapping such that upon being coiled the edge of electrode strip 20 projects above the coiled electrode assembly 16. Tab 2 of FIG. 1 is shown disposed over the projected edge of electrode strip 20 such that flanges 9, 11, 13 and 15 physically contact the edge of electrode strip 20. The flanges 9, 11, 13 and 15 are welded using conventional welding means to electronically and physically connect and secure tab 2 to electrode strip 20. A cover 24 is shown disposed over container 21 and secured to container 21 at its edge 23 using welding or similar conventional means. The cover 24 is also secured to tab 2 using spot welds or other securing means. The center of the cover 24 defines an opening 26 which can be used as the electrolyte solution filling hole. After the electrolyte solution is fed into the container, a closure 28 can be secured to cover opening 26. If desired, the cover 24 could be a solid disc without any openings. As can be appreciated from FIGS. 1 and 2, if the cover 26 was to bulge from internal pressure buildup then the central area would flex or telescope outward from slits 4 and 6 without disturbing the numerous welded contacts between flanges 9, 11, 13 and 15 and the edge of electrode strip 20. Thus building of the cell during storage or discharge would not break the electrical continuity of the cell. As is also apparent from FIG. 2, the height of tab 2 is extremely small and therefore move volume for a given cell size is available for the active cell components.

FIG. 3 shows another circular tab 30 having a plurality of straight line slits 32 disposed concentric about the center area of tab 30. As is apparent from FIG. 3, the central area of tab 30 can flex or telescope above and also below the plane of the tab through the use of the slits 32. Disposed concentric about the center of each tab 30 at 90° intervals are openings 34, 36, 38 and 40, with each opening being defined by a depending flange 33, 35, 37 and 39, respectively. The tab 30 would operate in the same manner as tab 2 shown in FIG. 1.

FIG. 4 shows another circular tab 42 having a plurality of straight line slits 44 disposed about the center area of tab 42. As is apparent from FIG. 4, the central area of tab 42 can flex or telescope above and also below the plane of the tab through the use of the slits 44. Disposed concentric about the center of each tab 42 at 90° intervals are openings 46, 48, 50 and 52, with each opening being defined by a depending flange 45, 47, 49 and 51, respectively. The tab 42 would operate in the same manner as tab 2 shown in FIG. 1.

FIG. 5 shows another circular tab 54 having a plurality of straight line slits 56 and curve slits 55 disposed about the center area of tab 54. As is apparent from FIG. 5, the central area of tab 54 can flex or telescope above and then below the plane of the tab through the use of the slits 56. Disposed concentric about the center of each tab 54 at 90° intervals art openings 58, 60, 62 and 64, with each opening being defined by a depending flange 57, 59, 61 and 63, respectively. The tab 54 would operate in the same manner as tab 2 shown in FIG. 1.

FIG. 6 shows another circular tab 66 having a coiled slit 68 disposed concentric about the center area of tab 66. As is apparent from FIG. 6, the central area of tab 66 can flex or telescope above and then below the plane of the tab through the use of the slit 68. Disposed concentric about the center of each tab 66 at 90° intervals are openings 70, 72, 74 and 76, with each opening being defined by a depending flange 69, 71, 73 and 75, respectively. The tab 66 would operate in the same manner as tab 2 shown in FIG. 1.

Figure 1:
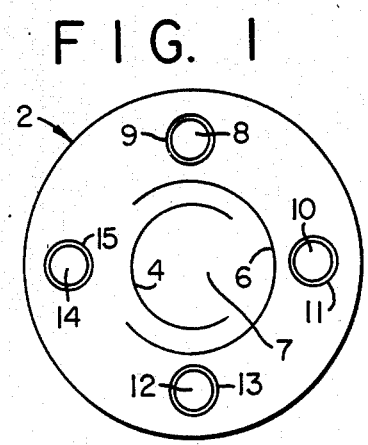
FIG. 1 is a top plan view of a circular tab for use in a galvanized cell in accordance with this invention.
Figure 2:
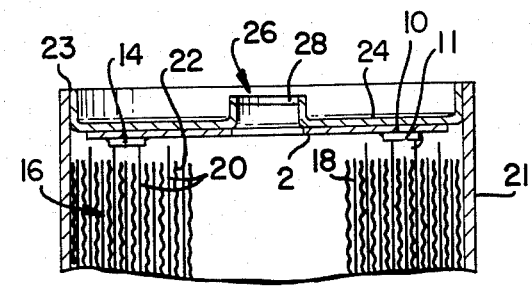
FIG. 2 is a partial sectional elevational view of a cell employing the circular tab of FIG. 1.
Figure 3:
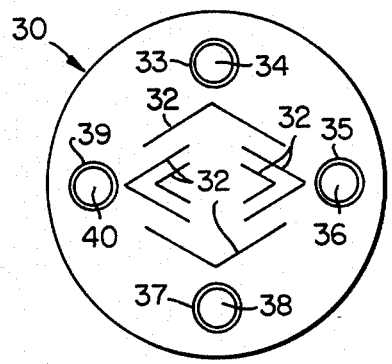
FIG. 3 is a top plan view of another circular tab embodiment for use in a cell in accordance with this invention.
Figure 4:
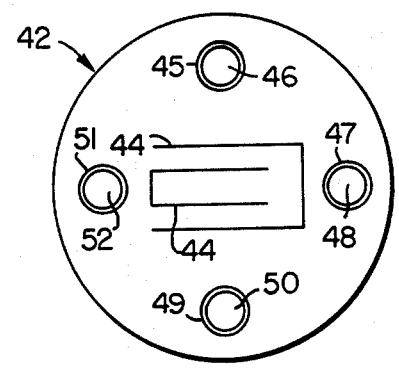
FIG. 4 is a top plan view of another circular tab embodiment for use in a cell in accordance with this invention.
Figure 5:
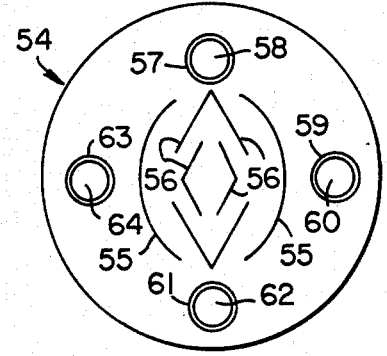
FIG. 5 is a top plan view of another circular tab embodiment for use in a cell in accordance with this invention.
Figure 6:
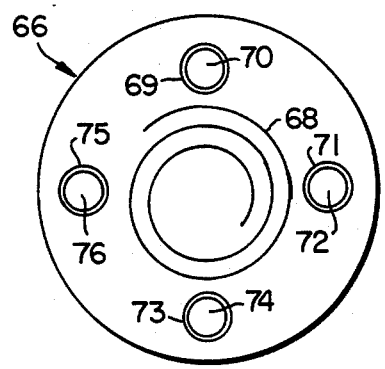
FIG. 6 is a top plan view of another circular tab embodiment for use in a cell in accordance with this invention.

Although preferred embodiments of this invention have been described in detail, it is contemplated that modifications and changes to the preferred embodiments of the invention herein shown and described can be made without departing from the spirit and scope of the invention.

What is claimed:

1. A galvanic cell comprising a coiled electrode assembly contained in a housing; said coiled electrode assembly comprising a first electrode strip superimposed on and overlapping a second electrode strip and a separator disposed between said first electrode strip and said second electrode strip; said first electrode strip, said second electrode strip and said separator are wound into a coiled electrode assembly such that said first electrode strip is electronically insulated from said second electrode strip by said separator and the edge of at least one electrode strip protrudes from the coiled electrode assembly at one end and electronically contacts a conductive terminal at a first portion of the housing, and the second electrode strip electronically contacts a conductive terminal at a second portion of the housing which is insulated relative to said first portion; the improvement wherein a conductive tab has at least one slit disposed substantially about the central area of the tab to enable the central area to flex above or below the plane of the tab to accommodate bulging of the cell, without effectively distorting the peripheral area of the tab, said tab being in electronic contact with the protruding edge of the electrode strip, and a conductive portion of the housing is electronically connected to said tab thereby adapting said conductive portion as the conductive terminal for said electrode strip having its edge protruding from the coiled electrode assembly.

2. The galvanic cell of claim 1 wherein said housing comprises a container sealed with a cover and said conductive portion is the cover of said housing.

3. The galvanic cell of claim 1 wherein said tab has at least one opening defined between the central area of the tab and the peripheral edge of the tab and said opening having a dependent flange that physically contacts the edge of the electrode strip protruding from the coiled electrode assembly.

4. The cell of claim 1 wherein said tab has four openings defined between the central area of the tab and the peripheral edge of the tab with each opening disposed concentric about the center of the tab at 90° intervals and each opening having a dependent flange that physically contacts the edge of the electrode strip protruding from the coiled electrode assembly.

5. The galvanic cell of claim 1 wherein said tab has at least one inward protrusion between the central area of the tab and the peripheral edge of the tab and said inward protrusion extending to physically contact the edge of the electrode strip extending from the coiled electrode assembly.

6. The cell of claim 1 wherein said tab has four inward protrusions between the central area of the tab and the peripheral edge of the tab with each inward protrusion disposed concentric about the center of the tab at 90° intervals and each inward protrusion extending to physically contact the edge of the electrode strip extending from the coiled electrode assembly.

7. The galvanic cell of claim 1 wherein said first electrode strip protrudes from one end of the coiled electrode assembly and said second electrode strip protrudes from the opposite end of the coiled electrode assembly and wherein a first tab having at least one slit disposed substantially about the central area of the tab is in electronic contact with the protruding edge of said first electrode strip; a first conductive portion of said housing is electronically connected to said first tab thereby adapting said first conductive portion as the conductive terminal for said electrode strip; a second tab having at least one slit disposed substantially about the central area of the tab is in electronic contact with the protruding edge of said second electrode strip; and a second conductive portion of said housing electronically insulated from the first conductive portion is electronically connected to said second tab thereby adapting said second conductive portion as the conductive terminal for said second electrode strip.

8. The galvanic cell of claim 1, 4, 6 or 7 wherein said slit in said tab comprises a coiled slit disposed completely about the central area of the tab to enable the central area to flex above or below the plane of the tab.

9. The galvanic cell of claim 1, 4, 6 or 7 wherein said tab has at least two accuate slits disposed concentric about the central area of the tab to enable the central area to flex above or below the plane of the tab.

10. The galvanic cell of claim 9 wherein each arcuate slit is about a 220° arc.

11. The galvanic cell of claim 1, 4, 6 or 7 wherein the tab has a plurality of straight line slits disposed about the central area of the tab to enable the central area to flex above or below the plane of the tab.

12. The galvanic cell of claim 11 wherein the tab has at least one acurate slit disposed about the central area of the tab cooperating with at least one straight line slit to enable the central area to flex above or below the plane of the tab.

13. The galvanic cell of claim 1 wherein one of said first and second electrode strips is an active anode.

14. The galvanic cell of claim 1 wherein one of said first and second electrode strips comprises an anode current collector along with an active anode.

15. The galvanic cell of claim 1 wherein one of said first and second electrode strips is an active cathode.

16. The galvanic cell of claim 1 wherein one of said first and second electrode strips is a cathode current collector.

17. The galvanic cell of claim 1 wherein one of said first and second electrode strips comprises a cathode current collector along with an active cathode.

18. The galvanic cell of claim 13 or 14 wherein the anode is selected from the group consisting of lithium, sodium, calcium, magnesium and zinc.

19. The galvanic cell of claim 15 or 17 wherein the active cathode is selected from the group consisting of $MnO_2$, $CuO$, $Ag_2O$, $FeS_2$, $TiS_2$, $(CF_x)_n$ where x is larger than 0 and less than 1 and $(C_2F)_n$.

20. The galvanic cell of claim 16 employing an active cathode selected from the group consisting of $SOCl_2$, $SO_2Cl_2$ and $SO_2$.

21. The galvanic cell of claim 1 employing an organic electrolyte and wherein the first electrode strip is lithium and the second electrode strip is selected from the group consisting of $MnO_2$, $CuO$, $FeS_2$, and $TiS_2$.

22. The galvanic cell of claim 1 wherein the first electrode strip is a carbonaceous material and wherein an active cathode is employed which is selected from the group consisting of $SOCl_2$, $SO_2Cl_2$ and $SO_2$.

23. A galvanic cell comprising a coiled electrode assembly contained in a housing; said coiled electrode assembly comprising a first electrode strip superimposed on and overlapping a second electrode strip and a separator disposed between said first electrode strip and said second electrode strip; said first electrode strip, said second electrode strip and said separator are wound into a coiled electrode assembly such that said first electrode strip is electronically insulated from said second electrode strip by said separator and the edge of at least one electrode strip protrudes from the coiled electrode assembly at one end and electronically contacts a conductive terminal at a first portion of the housing, and the second electrode strip electronically contacts a conductive terminal at a second portion of the housing which is insulated relative to said first portion; the improvement wherein a conductive tab has at least one slit disposed substantially about the central area of the tab to enable the central area to telescope above or below the plane of the tab when bulging of the cell due to internal pressure buildup occurs, without effective distorting the peripheral area of the tab, said tab being in electronic contact with the protruding edge of the electrode strip, and a conductive portion of the housing is electronically connected to said tab thereby adapting said conductive portion as the conductive terminal for said electrode strip having its edge protruding from the coiled electrode assembly.

* * * * *